United States Patent

Fan et al.

[11] Patent Number: 5,850,474
[45] Date of Patent: Dec. 15, 1998

[54] APPARATUS AND METHOD FOR SEGMENTING AND CLASSIFYING IMAGE DATA

[75] Inventors: Zhigang Fan, Webster, N.Y.; Kathy Ryall, Canbridge, Mass.; Jeng-Nan Shiau; Shriram Revankar, both of Webster, N.Y.

[73] Assignee: Xerox Corporation, Stamford, Conn.

[21] Appl. No.: 686,803

[22] Filed: Jul. 26, 1996

[51] Int. Cl.⁶ .............................. G06K 9/34; G06K 9/62
[52] U.S. Cl. ......................... 382/173; 382/180; 382/224
[58] Field of Search ..................... 382/180, 176, 382/173, 243, 245, 318, 319, 224; 358/462, 464, 467, 453

[56] References Cited

U.S. PATENT DOCUMENTS

| | | | |
|---|---|---|---|
| 5,073,953 | 12/1991 | Westdijk | 382/176 |
| 5,280,367 | 1/1994 | Zuniga | 358/462 |
| 5,285,504 | 2/1994 | Pavlidis et al. | 382/176 |
| 5,293,430 | 3/1994 | Shiau et al. | 382/173 |
| 5,359,673 | 10/1994 | de La Beaujardiere | 382/229 |

OTHER PUBLICATIONS

"Automatic Document Segmentation," IBM Technical Disclosure Bulletin, vol. 31, No. 7, Dec. 1988, pp. 73–74.
"Rule–Based System for Chinese Newspaper Segmentation," Signal Processing VI: Theories and Applications, vol. 1, No. Conf. 6, Aug. 1992, pp. 615–618.
"A Tool for Classifying Office Documents," Proc. of the 1993 IEEE Int'l Conference on Tools with AI, No. Conf. 5, Nov. 1993, pp. 427–434.

*Primary Examiner*—Jose L. Couso
*Assistant Examiner*—Dmitry A. Novik
*Attorney, Agent, or Firm*—Oliff & Berridge, PLC

[57] ABSTRACT

A method and apparatus for segmenting image data into windows and for classifying the windows as typical image types includes making two passes through the image data. The method includes a step of making a first pass through the image data to identify windows and to record the beginning points and image types of each of the windows, and a step of making a second pass through the image data to label each of the pixels as a particular image type. The invention also includes a macro-detection method and apparatus for separating a scanline of image data into edges and image runs and for classifying each of the edges and image runs as standard image types. In the macro-detection method, image runs and edges are classified based on micro-detection results and based on image types of adjacent image runs.

4 Claims, 6 Drawing Sheets

APPARATUS AND METHOD FOR SEGMENTING AND CLASSIFYING IMAGE DATA

BACKGROUND OF THE INVENTION

1. Field of the Invention

The invention relates to methods and apparatus for segmenting a page of image data into windows and for classifying the image data within each window as a particular type of image data.

2. Related Art

Image data is often stored in the form of multiple scanlines, each scanline comprising multiple pixels. When processing this type of image data, it is helpful to know the type of image represented by the data. For instance, the image data could represent graphics, text, a halftone, contone, or some other recognized image type. A page of image data could be all one type, or some combination of image types.

It is known in the art to take a page of image data and to separate the image data into windows of similar image types. For instance, a page of image data may include a halftoned picture with accompanying text describing the picture. In order to efficiently process the image data, it is known to separate the page of image data into two windows, a first window representing the halftoned image, and a second window representing the text. Processing of the page of image data can then be efficiently carried out by tailoring the processing to the type of image data being processed.

It is also known to separate a page of image data into windows and to classify and process the image data within the windows by making either one or two passes through the page of image data. The one pass method is quicker, but it does not allow the use of "future" context to correct information that has already been generated. In a two pass method, information obtained for a third or fourth scanline can be used to generate or correct information on a first or second scanline. In other words, future context can be used.

In a two pass method, during the first pass, the image is separated into windows, and a judgment is made about the type of image data in each window. At the end of the first pass, the image type for each pixel is recorded in memory. During the second pass, the information from the first pass, i.e., the image type data, is used to process the image data. Unfortunately, storing image type information for each pixel of a page of image data requires a great deal of memory, which increases the cost of an apparatus for performing this method.

SUMMARY OF THE INVENTION

The invention is an improved two pass method and apparatus for separating image data into windows and for classifying the image data within each window.

In the method, during the first pass through the image data, micro-detection and macro-detection are performed to separate each scanline of data into edge sections and image run sections. During micro-detection, the image type of each pixel is determined by examining neighboring pixels. During macro-detection, the image type of image runs of a scanline are determined based on the results of the micro-detection step. Known micro-detection methods can be used to accomplish these functions, such as the micro-detection methods described in U.S. Pat. No. 5,293,430 to Shiau et al., the disclosure of which is hereby incorporated by reference.

Next, the image run sections of the scanlines are combined to form windows. This is done by looking for portions of the image that are "white." Such areas are commonly called "gutters." The gutters typically separate different portions of a page of images. For instance, a white gutter region would exist between a half toned image and text describing the image. A horizontal gutter might exist between different paragraphs of a page of text. Likewise, a vertical gutter might exist between two columns of text.

Statistics on the macro-detection results within each window are then compiled and examined. Based on the statistics, each window is classified, if possible, as a particular image type. At the end of the first pass, the beginning point of each window is recorded in memory. If a window appears to contain primarily a single type of image data, the image type is also recorded. If a window appears to contain more than one image type, the window is identified as a "mixed" window.

During a second pass through the image data, the micro-detection, macro-detection and windowing steps are repeated. Those pixels within windows that were labeled as single image type during the first pass are simply labeled with the known image type. Those pixels that are within a window that was labeled as "mixed" during the first pass, are labeled based on the results of the micro-detection, macro-detection and windowing steps performed during the second pass. Once a pixel has been labeled as a particular image type, further processing of the image data may also occur during the second pass.

Because the same hardware is used to perform both the first and second passes, there is no additional cost for the second pass. In addition, because the image type classification of each pixel is not recorded at the end of the first pass, the memory requirements and thus the cost of an apparatus for performing the method are reduced.

In the method according to the invention, a macro-detection step for examining a scanline of image data may include the steps of separating a scanline into edge portions and image runs and classifying each of the image runs based on statistics for the image data within each image run. The macro-detection step could also include clean up steps wherein each of the edge sections of the scanline are also classified based on 1) the image data of the edge sections, and 2) the classification of surrounding image runs. The clean up steps might also include re-classifying image runs based on the classification of surrounding image runs.

BRIEF DESCRIPTION OF THE DRAWINGS

Preferred embodiments of the invention will be described with reference to the following drawings, wherein like reference numerals refer to like elements, and wherein.

DETAILED DESCRIPTION OF PREFERRED EMBODIMENTS

Figure 1:
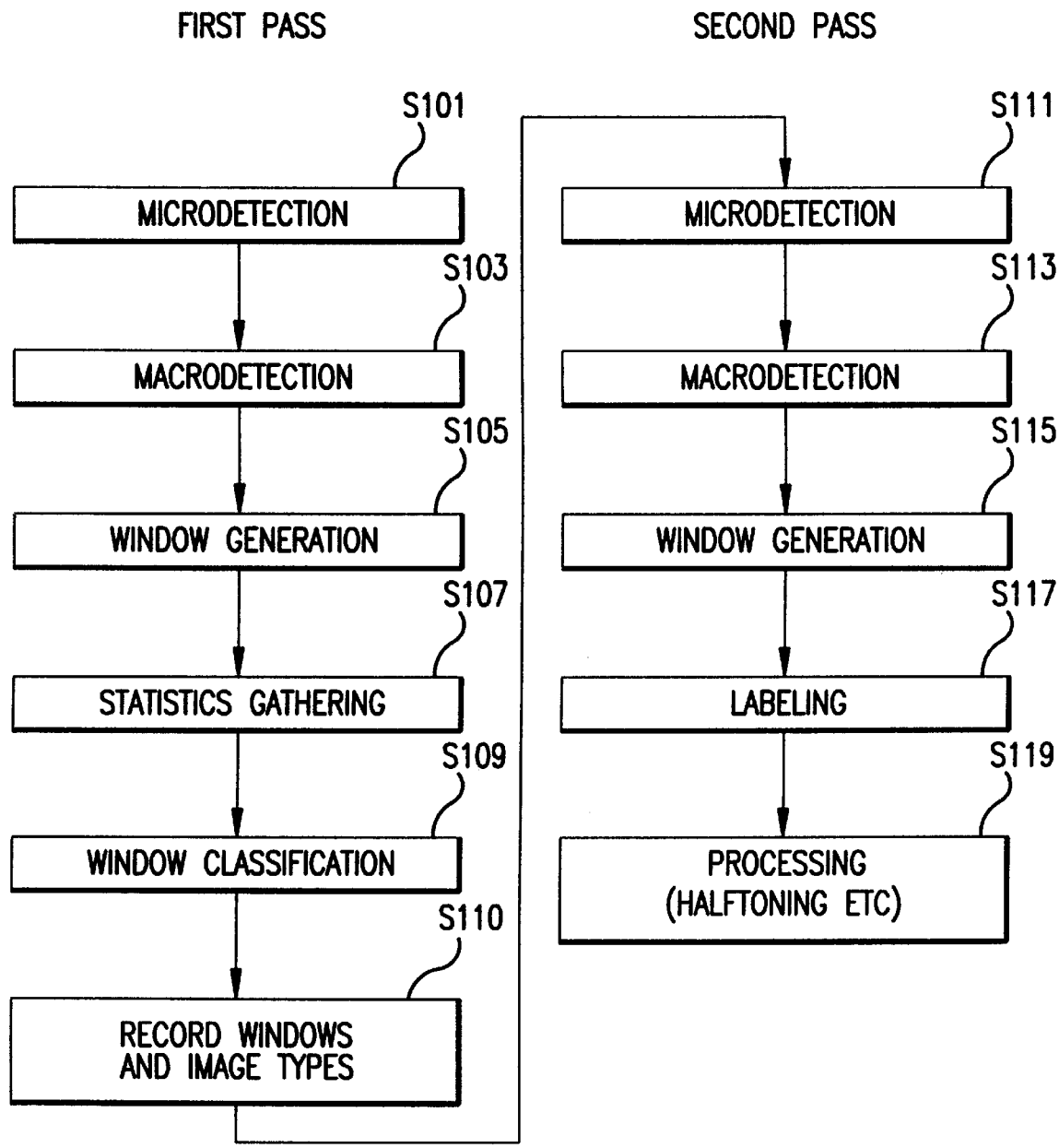
FIG. 1 shows a block diagram illustrating a two pass segmentation and classification method embodying the invention.

A block diagram of a two pass segmentation and classification method embodying the invention is shown in FIG. 1. The method segments a page of image data into windows, classifies the image data within each window as a particular image type and records information regarding the window and image type of each pixel. Once the image type for each window is known, further processing of the image data can be efficiently performed.

The image data comprises multiple scanlines of pixel image data, each scanline typically including intensity information for each pixel within the scanline. Typical image types include graphics, text, low-frequency halftone, high-frequency halftone, contone, etc.

During a first step S101, micro-detection is carried out. During micro-detection, multiple scanlines of image data are buffered into memory. Each pixel is examined and a preliminary determination is made as to the image type of the pixel. In addition, the intensity of each pixel is compared to the intensity of its surrounding neighboring pixels. A judgment is made as to whether the intensity of the pixel under examination is significantly different than the intensity of the surrounding pixels. When a pixel has a significantly different intensity than its neighboring pixels, the pixel is classified as an edge pixel.

During a second step S103, macro-detection is performed. During the macro-detection step, the results of the micro-detection step are used to identify those pixels within each scanline that are edges and those pixels that belong to image runs. The image type of each image run is then determined based on the micro-detection results. The image type of an image run may also be based on the image type and a confidence factor of an adjacent image run of a previous scanline. Also, if an image run of a previous scanline was impossible to classify as a standard image type, but information generated during examination of the present scanline makes it possible to determine the image type of the image run of the previous scanline, that determination is made and the image type of the image run of the previous scanline is recorded.

Figure 5:
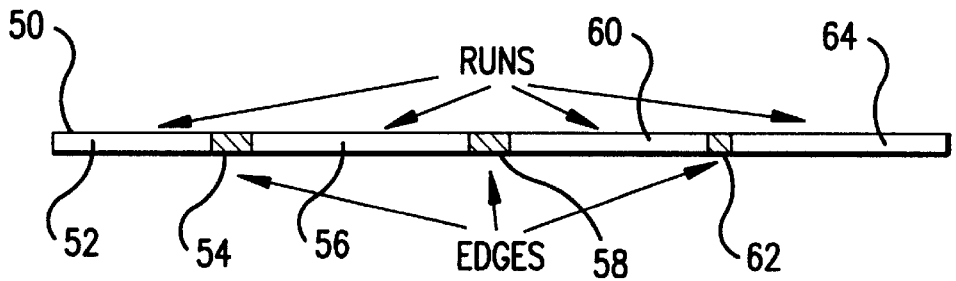
FIG. 5 shows a graphical representation of a scanline of image data.

An example of a single scanline of image data is shown in FIG. 5. During the macro-detection step, adjacent pixels having significantly different intensities from each other are classified as edges 54, 58 and 62. Portions of the scanline between the edges are classified as image runs 52, 56, 60 and 64.

Figure 2:
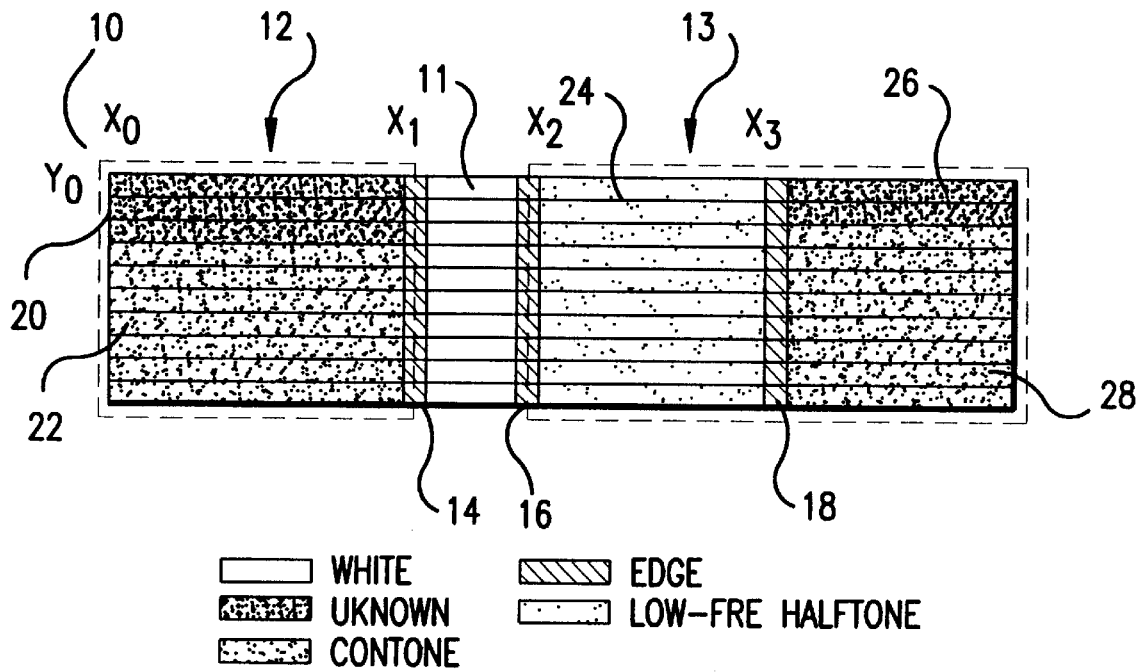
FIG. 2 shows a graphical representation of scanlines of image data that have been separated into windows during a first pass.

In the next step S105, the image runs of adjacent scanlines are combined to form windows. A graphical representation of multiple scanlines that have been grouped into windows is shown in FIG. 2. The image data has been separated into a first window 12 and a second window 13, separated by a gutter 11. A first edge 14 separates the first window 12 from the remainder of the image data. A second edge 16 separates the second window 13 from the remainder of the image data. In addition, a third edge 18 separates the second window 13 into first and second portions having different image types.

In the next step S107, statistics are gathered and calculated for each of the windows. The statistics are based on the intensity and macro-detection results for each of the pixels within a window.

In the next step S109, the statistics are examined in an attempt to classify each window. Windows that appear to contain primarily a single type of image data are classified according to their dominant image types. Windows that contain more than one type of image are classified as "mixed."

At the end of the first pass, in step S110, the beginning point and the image type of each of the windows is recorded.

During the second pass, in steps S111, S113 and S115, the micro-detection, macro-detection and window generation steps, respectively, are repeated. In the next step S117, labeling of the pixels occurs. During the labeling step, information about the image type and the window of each pixel is recorded. If a pixel is within a window that was classified as a particular image type during the first pass, each pixel within the window is labeled with the window's image type. If a pixel is within a window that was classified as "mixed" during the first pass, the micro-detection, macro-detection and windowing steps performed during the second pass are used to assign an image type to the pixel. At the end of the labeling step, each pixel is labeled as a particular image type.

Once each portion of the image data has been classified according to standard image types, further processing of the image data can be efficiently performed. Because the micro-detection and macro-detection results from the first pass are not recorded for each pixel of the image, the memory requirements for a device embodying the invention are minimized. This helps to minimize the cost of such an apparatus.

Figure 3:
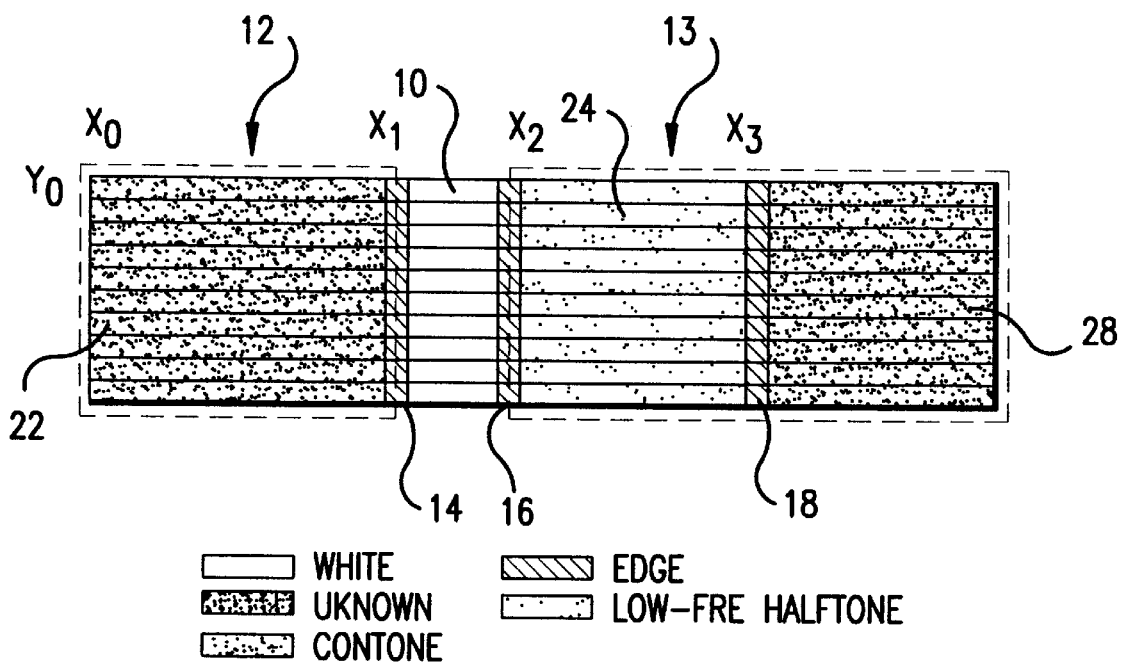
FIG. 3 shows a graphical representation of scanlines of image data that have been separated into windows during a second pass.

An example of how the two pass method can be used to identify and classify windows within an image is illustrated in FIGS. 2 and 3. The image data 10 is comprised of multiple scanlines of pixel data. FIG. 2 shows the results of a first pass through the image data, and FIG. 3 shows the results of the second pass through the same image data.

During the micro-detection and macro-detection steps of the first pass, the image runs and edges of each scanline are identified, and, if possible, the image types of the image runs and edges are determined. During the windowing step, the windows are identified. As shown in FIG. 2, a first portion 20 of the image data within the first window 12 was an unknown image type, and a second portion 22 was identified as contone. Within the second window 13, a first portion 24 was identified as low-frequency halftone, a second portion 26 was an unknown image type, and a third portion 28 was identified as contone.

At the end of the first pass, the image types and the beginning points of the first and second windows are recorded. The beginning point of the first window 12 is recorded as $X_0, Y_0$. Because primarily a single type of image data (contone) was detected within the first window 12, the image type of the first window is recorded as contone. The beginning point of the second window 13 is recorded $X_2, Y_0$. Because two image types (low-frequency halftone and contone) were detected in the second window, the image type of the second window 13 is recorded as mixed.

Also, if one or more image runs of a mixed window were impossible to classify upon initial examination, but examination of adjacent image runs of subsequent scanlines make it possible to determine the image type of the unknown image runs, then the beginning point and image type of the unknown image runs are also recorded at the end of the first pass. For example, and with reference to FIG. 2, during the first pass through a second portion 26 of the second window 13, it was initially impossible to classify the image runs of the first two scanlines. These image runs are shaded black in FIG. 2 to indicate that they are unknown. During processing of the third scanline of the second portion 26, however, it became possible to identify the image runs of the first two scanlines as contone. Accordingly, at the end of the first pass the beginning point of the unknown section $X_3$, $Y_0$ is recorded, along with the image type contone. This information can be used during the second pass to immediately classify image runs that would normally be impossible to classify based on the microdetection results alone.

During the second pass, the micro-detection, macro-detection and windowing steps are performed a second time. Next, each pixel is labeled with an image type. Pixels within the first window 12 are labeled as contone. Pixels and image runs within the second window 13 are labeled based on the results of the micro-detection and macro-detection steps performed during the second pass and the information on the unknown sections recorded during the first pass.

As shown in FIG. 3, the pixels within the first window 12 are classified as contone, the pixels within the first portion 24 of the second window 13 are classified as low-frequency halftone, and the pixels within the second portion of the second window 13 is now labeled entirely as contone.

Figure 4:
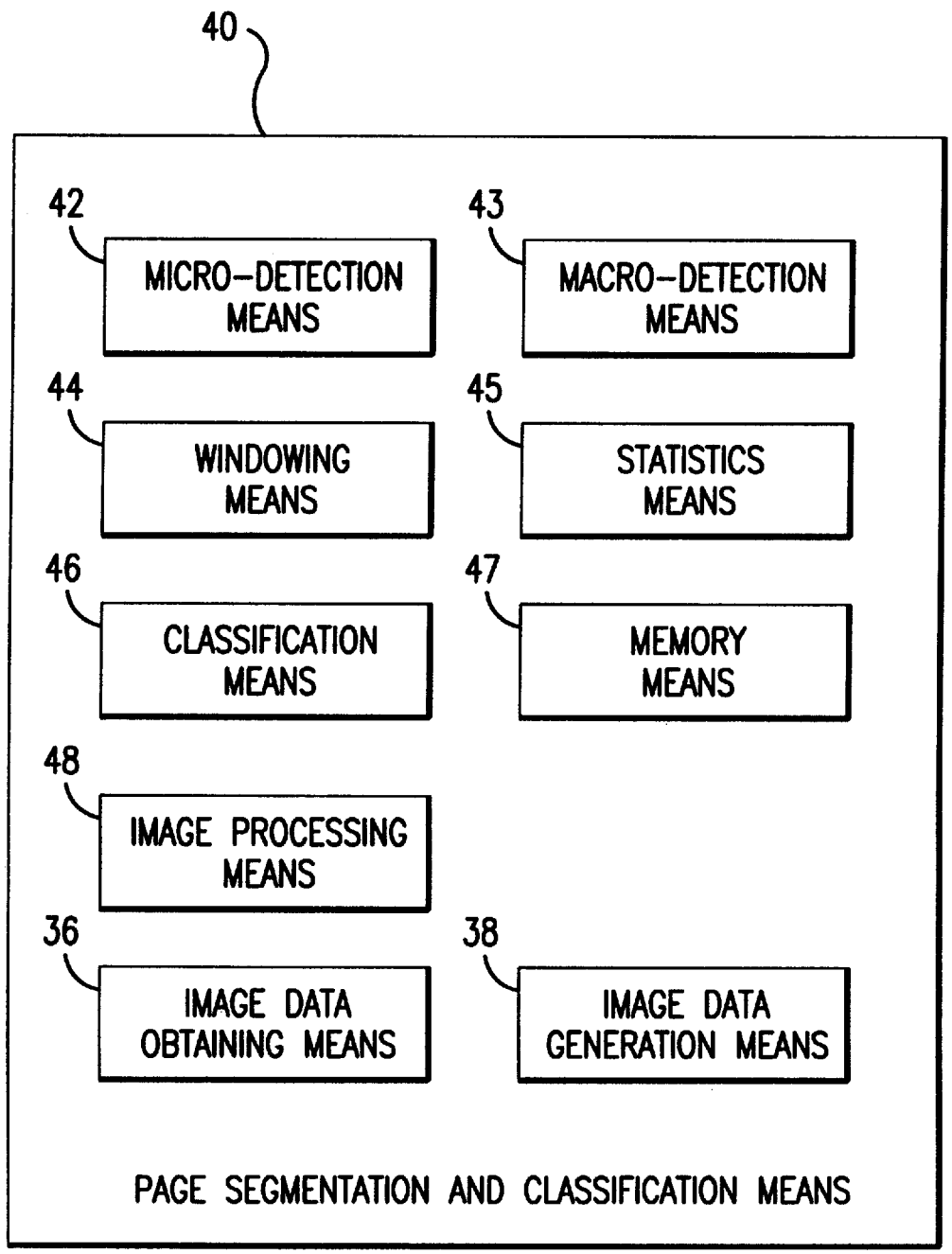
FIG. 4 shows a block diagram of a page segmentation and classification apparatus embodying the invention.

A block diagram of a page segmentation and classification apparatus capable of performing the two pass method of the invention is shown in FIG. 4. The page segmentation and classification means 40 includes micro-detection means 42 for performing the micro-detection step, macro-detection means 43 for performing the macro-detection step and windowing means 44 for grouping image runs of the scanlines together to form windows. The apparatus also includes statistics means 45 for gathering and calculating statistics regarding the pixels within each window and classification means 46 for classifying each of the windows as a particular image type based on the gathered statistics.

Memory means 47 are provided for recording the beginning points and image types of each of the windows and the beginning points and image types of any initially unknown image runs that were subsequently classified during the first pass. The memory means 47 may also be used to store the window and image type of each pixel at the end of the second pass. Typically, however, the image data is used immediately to process, transmit and/or print the image, and the image data is discarded.

The page segmentation and classification means 40 may also include image processing means 48 for processing the image data after each of the pixels has been labeled with an image type and as belonging to a particular window.

A page segmentation and classification apparatus embodying the invention might include a typical computer processor and software designed to accomplish each of the steps of the two pass method. The apparatus might also include image data obtaining means 36 for obtaining an image to be processed by the two pass method. The image data obtaining means 36 could include a scanner or a device for reading a stored image from a memory. The device might also include image data generation means 38 for generating image data to be segmented and classified by the two pass method. The image data generation means could include a software program for generating an image or a word-processing program that generates a page of text or a page of mixed text and images.

Figure 6:
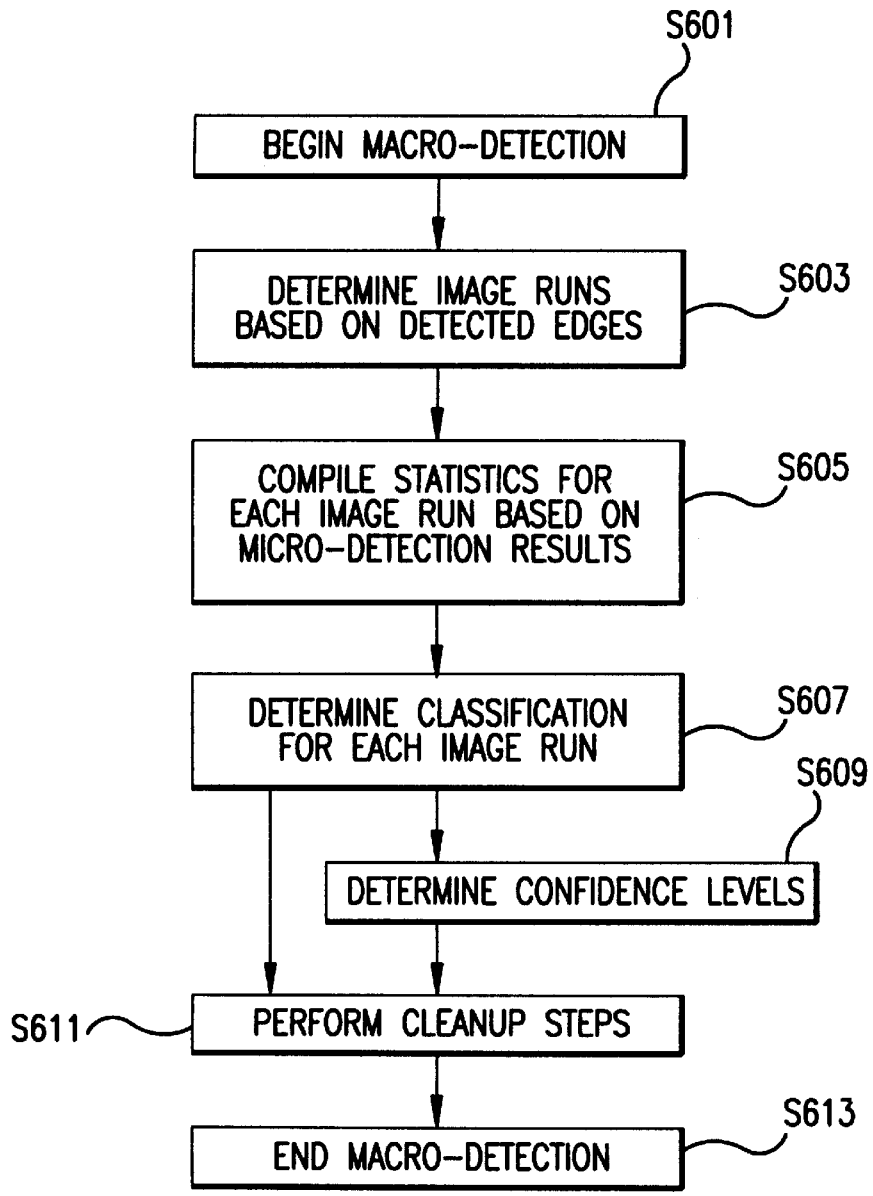
FIG. 6 shows a block diagram illustrating a macro-detection method embodying the invention.

A block diagram of a macro-detection method suitable for use with the above-described two pass segmentation and classification method is shown in FIG. 6. The macro-detection method utilizes micro-detection results that have already been generated in a micro-detection step to separate a scanline of image data into image runs and edges. The image type of the image runs is classified first, and then the image type of the edges is classified based on the image type of the adjacent image runs.

With reference to FIG. 6, in step S603, the beginning points and ending points of the image runs are determined based upon the locations of the edge pixels detected during the micro-detection step. In the next step S605, statistics for each of the pixels within each image run are collected and/or calculated based on the micro-detection results. In the next step S607, the statistics as well as the results of the previous scanline are used to determine the probable image type classifications for each of the image runs.

The method could also include a step S609 wherein a confidence factor is determined for each of the image runs. The confidence factor for an image run indicates the relative likelihood that the image run has been correctly classified. For those image runs that have pixels with a relatively uniform intensity, the confidence factor would be high. For those image runs that have pixels with many different intensity levels, the confidence level would be relatively low. The confidence factor for an image run would be recorded in memory. When the process proceeds to the next scanline, the confidence factor of an adjacent segment of the previous scanline could be used in combination with the micro-detection results to determine the image type of an image run.

During the clean up steps S611, each of the edges may be given an image type classification, and some of the image runs may be re-classified.

Figure 7:
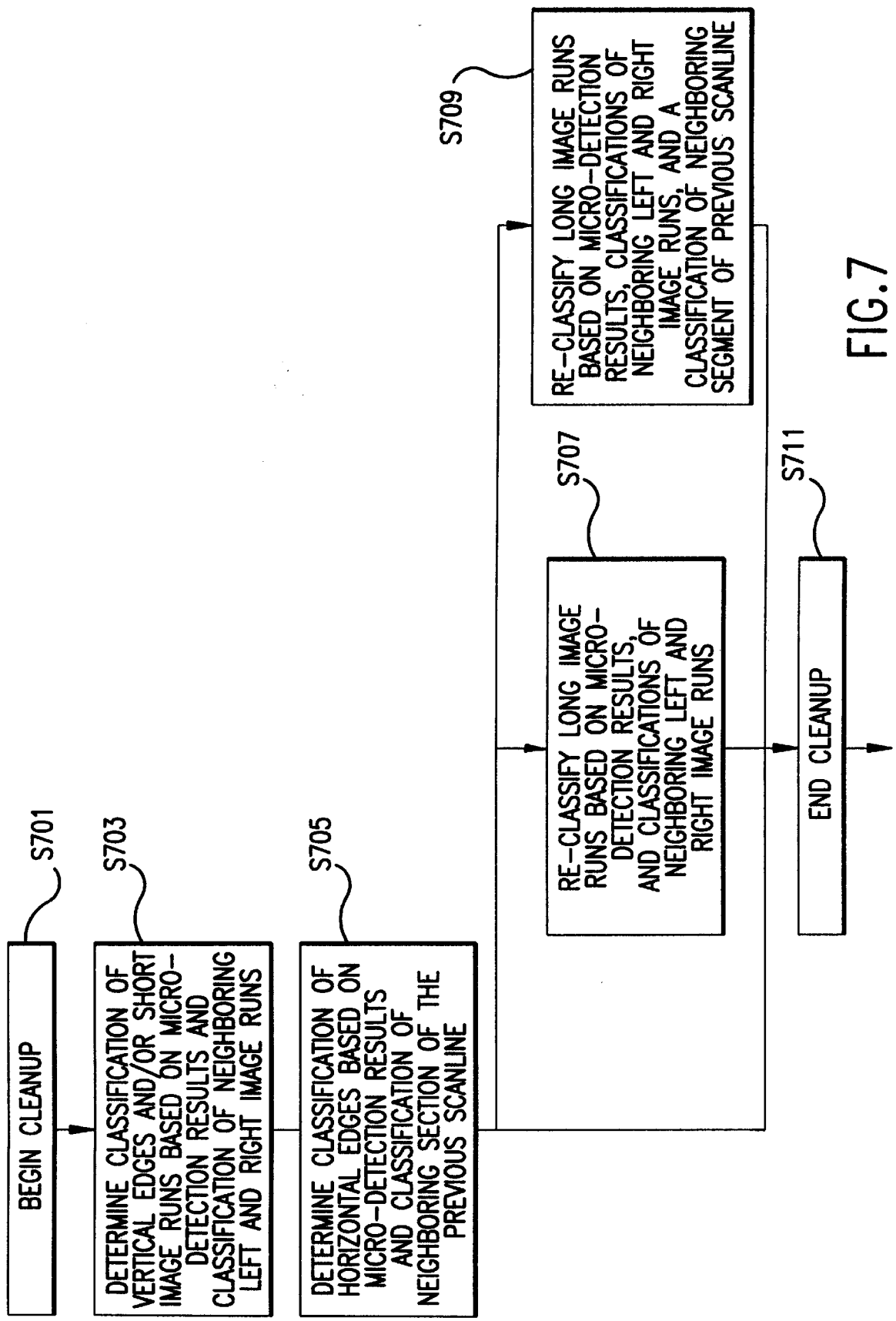
FIG. 7 shows a block diagram illustrating a clean up step of a macro-detection method embodying the invention.

A block diagram showing potential clean up steps S611 is shown in FIG. 7. In step S703, the image type of vertical edges is determined based on the micro-detection results and the image types of neighboring left and right image runs. In addition, short image runs may also be re-classified in step S703 based on the micro-detection results and the classification of neighboring left and right image runs.

In the next step S705, the image types of horizontal edges are determined based on micro-detection results for the horizontal edges and the image types of a neighboring section of the previous scanline.

In some embodiments of the invention, the clean up steps would end at this point. In other embodiments of the invention, the clean up steps would further comprise an additional step S707, wherein long image runs are reclassified based on the micro-detection results and the image types of neighboring left and right image runs.

In yet another alternate embodiment, the clean up steps could include a step S709 wherein long image runs are re-classified based on the micro-detection results, image types of neighboring left and right image runs and image types of one or more neighboring segments of a previous scanline.

Thus, in the clean up steps S611, the edges and short image runs can be classified based on the context of the surrounding image portions and/or based on the context of a previous scanline. In addition, long image runs may be re-classified based on the context of surrounding image runs and/or the context of a previous scanline.

Figure 8:
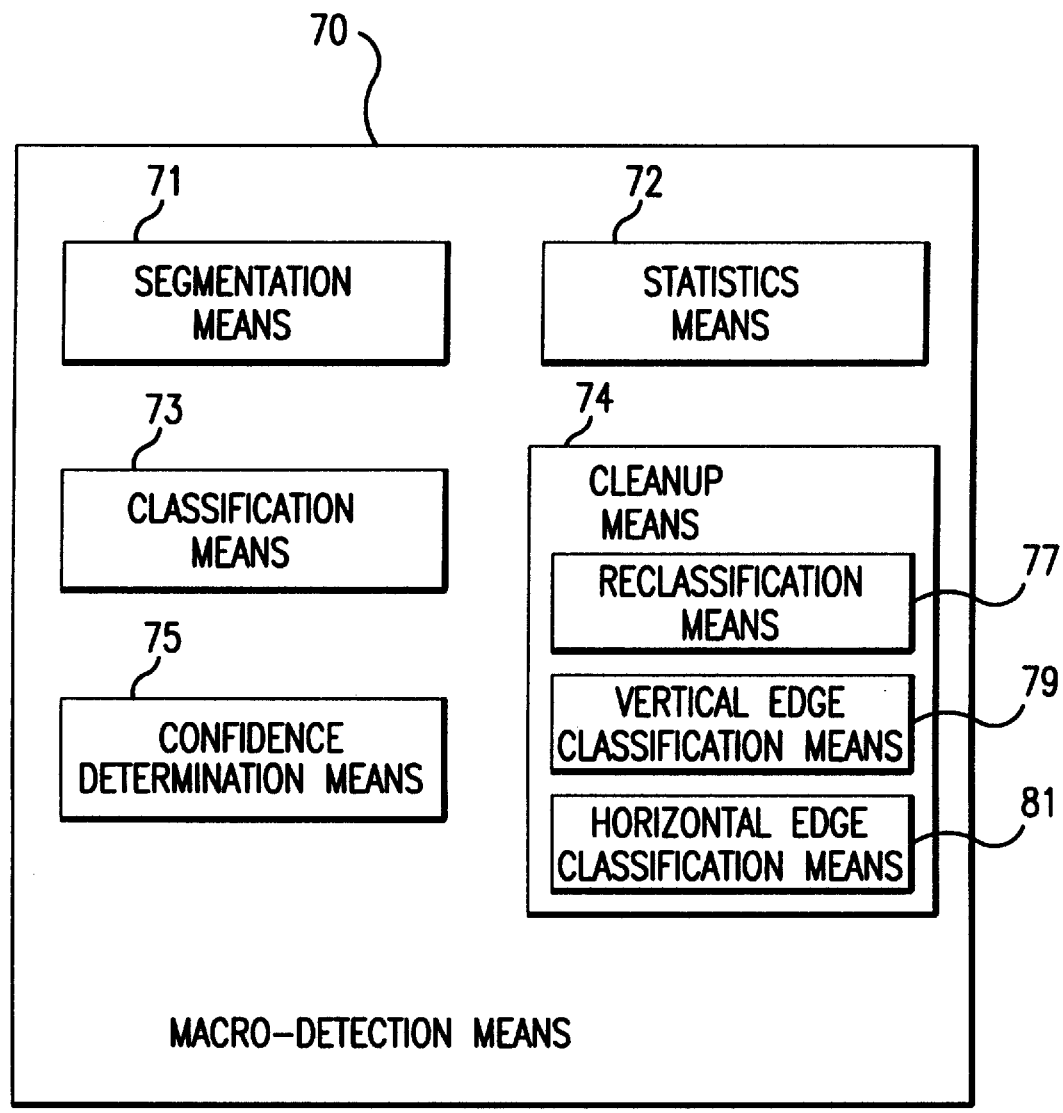
FIG. 8 is a block diagram of a macro-detection apparatus embodying the invention.

FIG. 8 is a block diagram showing an apparatus capable of performing the macro-detection method according to the invention. The macro-detection means 70 includes segmentation means 71 for separating a scanline of image data into edges and image runs, statistics means 72 for gathering and calculating statistics for the pixels within each scanline, classification means 73 for determining the image types of the image runs and the edges and clean up means 74 for classifying edges and for re-classifying image runs. The macro-detection means can also include confidence determination means 75 for determining a confidence factor indicating a probability that an image type classification of an image run is correct.

The clean up means 74 may include reclassification means 77 for re-classifying image runs, vertical edge classification means 79 for classifying vertical edges and horizontal edge classification means 81 for classifying vertical edges.

An apparatus embodying the invention and capable of performing the macro-detection method could include a computer processor and associated software programs to carry out each of the steps shown in FIGS. 6 and 7.

While the invention has been described in connection with preferred embodiments, the invention is not limited to the disclosed embodiments. On the contrary, the application is intended to cover all alternatives, modifications and equivalents that may be included within the spirit and scope of the invention, as defined by the appended claims.

What is claimed is:

1. A computer implemented method of segmenting and classifying image data, the image data comprising a plurality of scanlines of pixel data, comprising the steps of:

performing a first pass through the image data to identify at least one window and to determine an image type of the image data within each at least one window, including performing micro-detection to identify intensity edge pixels, performing macro-detection to identify at least one image run in each scanline, identifying at least one window comprising image runs of at least two scanlines, and classifying each at least one window as containing a single image type or as containing mixed image types;

recording solely the beginning point and the image type of each at least one window; and performing a second pass through the image data to label each pixel of the image data as being a particular image type.

2. The method of claim 1, wherein the step of performing a second pass through the image data comprises the steps of:

performing micro-detection to identify intensity edge pixels;

performing macro-detection to identify at least one image run in each scanline;

identifying at least one window comprising image runs of at least two scanlines; and determining, based on results of micro-detection and macro-detection steps performed during the second pass, the image type of any portions of the image data that are within a window classified as containing mixed image types during the first pass.

3. An apparatus for segmenting and classifying image data, the image data comprising a plurality of scanlines of pixel data, the apparatus comprising:

means for performing a first pass through the image data to identify at least one window and to determine an image type of the image data within each at least one window, including means for performing micro-detection to identify any intensity edge pixels, means for performing macro-detection to identify at least one image run in each scanline, means for identifying at least one window comprising image runs of at least two scanlines, and means for classifying each at least one window as containing a single image type or as containing mixed image types;

memory means for recording solely the beginning point and the image type of each at least one window and for recording solely an image type of each pixel of the image data; and means for performing a second pass through the image data to label each pixel of the image data as being a particular image type.

4. The apparatus of claim 3, wherein the means for performing a second pass through the image data comprises:

means for performing micro-detection to identify intensity edge pixels;

means for performing macro-detection to identify at least one image run in each scanline;

means for identifying at least one window comprising image runs of at least two scanlines; and means for determining, based on results of micro-detection and macro-detection steps performed during a second pass, the image type of any portions of the image data that are within a window classified as containing mixed image types during the first pass.

\* \* \* \* \*